(12) United States Patent
Edvardsson (10) Patent No.: US 11,435,214 B2
(45) Date of Patent: Sep. 6, 2022

(54) TRANSMISSION LINE PROBE (71) Applicant: Rosemount Tank Radar AB, Mölnlycke (SE)

(72) Inventor: Olov Edvardsson, Linköping (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 143 days.

(21) Appl. No.: 16/914,734

(22) Filed: Jun. 29, 2020

(65) Prior Publication Data

US 2021/0003440 A1 Jan. 7, 2021

(30) Foreign Application Priority Data

Jul. 3, 2019 (EP) .................................... 19184075

(51) Int. Cl.
*G01F 23/284* (2006.01)
*G01S 13/88* (2006.01)
(52) U.S. Cl.
CPC .......... *G01F 23/2845* (2013.01); *G01S 13/88* (2013.01)
(58) Field of Classification Search
CPC ..... G01F 23/62; G01F 23/284; G01F 23/2845
See application file for complete search history.

(56) References Cited

U.S. PATENT DOCUMENTS

| | | | | |
|---|---|---|---|---|
| 2,018,353 A | * | 10/1935 | Gothe | ................ H01B 11/1856 |
| | | | | 174/111 |
| 2,587,916 A | * | 3/1952 | Squier | .................... G08B 17/06 |
| | | | | 174/124 R |
| 3,105,287 A | * | 10/1963 | Whearley | .............. H01B 3/082 |
| | | | | 65/60.8 |
| 6,053,041 A | | 4/2000 | Sinha | |
| 6,927,332 B1 | * | 8/2005 | Phillips | .................... G01R 1/24 |
| | | | | 174/111 |

(Continued)

FOREIGN PATENT DOCUMENTS

| | | |
|---|---|---|
| EP | 0 451 493 | 10/1991 |
| EP | 2 161 585 | 3/2010 |

(Continued)

OTHER PUBLICATIONS

Communication including the extended European Search Report from European Patent Application No. 19184075.0, dated Dec. 18, 2019.

*Primary Examiner* — John Fitzgerald
(74) *Attorney, Agent, or Firm* — Westman, Champlin & Koehler, P.A.

(57) ABSTRACT

The present invention relates a transmission line probe for use in a radar level gauge system configured to determine a filling level (L) and a density of a product contained in a container, wherein the transmission line probe comprises: at least one probe line adapted to guide an electromagnetic transmit signal ($S_T$) towards and at least partly through the product, and to guide an electromagnetic return signal ($S_R$) back from a surface or interface of the product; and a plurality of insulating dielectric beads arranged along the at least one probe line and configured to decrease electromagnetic signal attenuation caused by the product. The present invention also relates to a radar level gauge system comprising such a transmission line probe, and to a corresponding method.

18 Claims, 7 Drawing Sheets

(56) References Cited

U.S. PATENT DOCUMENTS

| | | | |
|---|---|---|---|
| 8,941,532 B2 | 1/2015 | Fredriksson | |
| 9,178,275 B2* | 11/2015 | Schultheiss | H01Q 1/42 |
| 9,574,929 B2* | 2/2017 | Cobianu | G01S 13/88 |
| 10,184,820 B2* | 1/2019 | Edvardsson | G01S 7/282 |
| 10,295,393 B2* | 5/2019 | Eriksson | G01F 23/284 |
| 2007/0090992 A1 | 4/2007 | Edvardsson | |
| 2009/0256737 A1* | 10/2009 | Ohlsson | H01Q 21/065 |
| | | | 342/124 |
| 2010/0156702 A1 | 6/2010 | Edvardsson | |
| 2014/0084945 A1 | 3/2014 | Edvardsson | |
| 2015/0177163 A1 | 6/2015 | Edvardsson | |
| 2018/0094962 A1* | 4/2018 | Edvardsson | G01F 23/284 |
| 2018/0094963 A1* | 4/2018 | Eriksson | G01F 23/284 |
| 2018/0183126 A1* | 6/2018 | Edvardsson | G01F 23/284 |

FOREIGN PATENT DOCUMENTS

| | | |
|---|---|---|
| GB | 694 622 | 7/1953 |
| GB | 988 576 | 4/1965 |

* cited by examiner

TRANSMISSION LINE PROBE

CROSS-REFERENCE TO RELATED APPLICATION

This application claims priority to European Patent Application No. 19184075.0, filed on Jul. 3, 2019, the content of which is hereby incorporated by reference in its entirety.

FIELD OF THE INVENTION

The present invention relates to a transmission line probe for a radar level gauge (RLG) system. The present invention also relates to a radar level gauge system comprising such a transmission line probe, and to a corresponding method.

BACKGROUND OF THE INVENTION

It known to use guided wave radar (GWR) in solid level applications. A Rosemount 5303 transmitter with a flexible single lead probe could for example be used, and the measurement is made where the probe comes in contact with the material. The material could for example be plastics, fly-ash, cement, sand, (cereal) grains, and others.

Cereal grains of many types like rice, corn, wheat, etc. are extensively stored and transported. However, to measure the amount accurately enough, both volume (in big silos measured by level as e.g. exemplified in the preceding paragraph) and moisture content must be known. Each different type of grain has a so-called standard bushel weight at a specific moisture content, whereby the mass of the grains contained in a silo can be derived from the volume and moisture content.

SUMMARY OF THE INVENTION

It is an object of the present invention to provide an improved radar level gauge system and transmission line probe which in particular can be used to accurately measure (cereal) grains contained in silo.

According to a first aspect of the present invention, this and other objects are achieved by a transmission line probe for use in a radar level gauge system configured to determine a filling level and a density of a product contained in a container, wherein the transmission line probe comprises: at least one probe line adapted to guide an electromagnetic transmit signal towards and at least partly through the product, and to guide an electromagnetic return signal back from a surface or an interface below the surface of the product; and a plurality of insulating dielectric beads arranged along the at least one probe line and configured to decrease electromagnetic signal attenuation caused by the product.

'Density' should here be construed as volumetric mass density (mass per unit volume). The product could be (cereal) grains. The container can for example be a silo. The at least one probe line could be at least one wire. 'Insulating' may be construed as the beads being configured to protect the electromagnetic signals along the at least one probe line from attenuation by the product.

The present invention is at least partly based on the understanding that the plurality of insulating dielectric beads allows measurement also in the product, possibly all the way to the lower end of the transmission line probe, without the (cereal) grains attenuating the electromagnetic transmit signal (too much), which otherwise would be the case without the insulating dielectric beads. In this way, not only the filling level but also the density of the product in the container can be determined, as will be elaborated further below. For a naked probe line (without the insulating dielectric beads), the attenuation by grains could be 30-40 dB per meter, which makes measurement through the product practically impossible. It can be noted that a dielectric structure essentially enclosing a probe line, which enclosing structure is arranged to reduce microwave energy attenuating effect caused by content to be gauged, is previously known, see for example US2007090992 (Edvardsson), wherein an exemplified content is oil. The contents of US2007090992 is herein incorporated by reference. However, the present inventor has realized that for solids like (cereal) grains, the insulating dielectric means does not have to seal the at least one probe line. Contrary, some gaps can at least temporarily be allowed, as long as the gaps are smaller than the grains. The inventor also realized that for grains, the insulating dielectric means may have to be relatively thick, which would make a conventional transmission line probe with a dielectric enclosing structure stiff. To this end, the present inventor devised the insulating dielectric beads arranged along the at least one probe line. The insulating dielectric beads, which for example may be threaded on the at least one probe line, allow the transmission line probe to be flexible (kind of like a beaded necklace), which facilitates transportation and installation. The transmission line probe, which may be >30 m long, could for example be rolled up during transportation.

To quantify the necessary degree of insulation, the transmission velocity (which is mandatory to know when measuring distance) can be used. The present transmission line probe may have a velocity reduction factor above 0.9. The transmission line probe designed with such a velocity reduction factor may give a sufficient decrease in electromagnetic signal attenuation while at the same time give a useful surface echo. In comparison, for a naked probe line, the velocity reduction factor is $1/\sqrt{DC}$, which is around 0.5 for grain and 0.65-0.7 for oil. The velocity reduction factor indicates how much slower the electromagnetic signals travel along or in the transmission line probe when the transmission line probe is in the product compared to when the transmission line probe is in atmosphere (air). In other words, the velocity reduction factor compares the propagation velocity when the insulated transmission line probe is in air to the case when the same transmission line probe is submerged in the product (grain etc.) to be measured. The velocity reduction factor may also be a measure of the "insulation" provided by the plurality of insulating dielectric beads. Expressed otherwise, the present transmission line probe may be configured such that the decrease of the (electromagnetic signal) velocity is less than four times less than the decrease when uninsulated probe lines are immersed in the product but always more than 2-3%. The propagation velocity is $\sqrt{1/LC_{tot}}$, wherein L is an inductance and $C_{tot}$ is the capacitance per meter including losses with surrounding material (both the insulating dielectric beads and the product), see further below.

Figure 8:
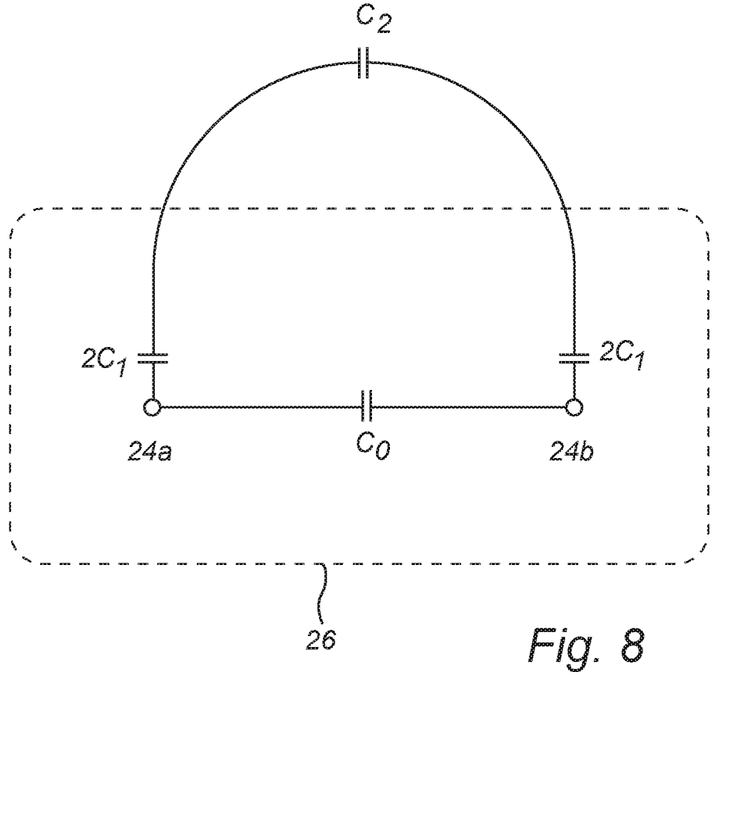
FIG. 8 shows an equivalent scheme of an embodiment of the present transmission line probe.

Furthermore, in case the at least one probe line is twin probe lines, the transmission line probe may be described by three capacitances $C_0$, $C_1$, $C_2$, wherein $C_1$ and $C_2$ are connected in series, and wherein $C_0$ is connected in parallel with $C_1$ and $C_2$, see FIG. 8. $C_2$ is (in use) filled with the product in the container, and $C_0$ and $C_1$ have the plastic or ceramic material of the plurality of insulating dielectric beads as dielectric filling. The capacitance C1 is in FIG. 8 divided in two times $2C_1$, to stress that the product generally is not in contact with any of the probe lines. Preferably the present transmission line probe is configured such that the total capacitance $C_{tot}$ (actual line capacitance per meter) does not increase more than 10%, more preferably not more than 5%, when the transmission line probe is submerged in oil compared to when the transmission line probe is surrounded by air. As understood from FIG. 8, the increase of capacitance when the transmission line probe is submerged (as compared to air) is a bit depending on the surrounding product (for this transmission line probe some type of grain) and by a suitable insulation the increase of capacitance will be 5-10%. Characteristic for this type of insulated transmission line probe is that the increase of capacitance (submerged compared to through air) will be much less than for a naked probe line and this is especially true for the losses which are on the imaginary part of the complex dielectric constant. From FIG. 8 one can see that even a very high or very lossy dielectric constant outside of the transmission line probe will have a limited influence on the propagation the transmission line probe.

Furthermore, the plurality of insulating dielectric beads may be configured such that the maximum two-way electromagnetic signal attenuation caused by the product is ≤0.3 dB per meter when the transmission line probe is surrounded by grains, which for most types will have a dielectric constant in the order of 4 and a loss tangent close to 0.1, or no more than 20 dB for the whole transmission line probe. This may allow measurement all the way to the lower end of the transmission line probe (i.e. typically all the way to the bottom of the container), even for long transmission line probes. The dielectric constant in the order of 4 and loss tangent close to 0.1 would for naked probe lines give an attenuation around 40 dB/m at 1 GHz typical for GWR systems.

The transmission line probe may further comprise reflectors provided at fixed and predetermined positions along the at least one probe line, wherein each reflector of the reflectors is configured to reflect a portion of the electromagnetic transmit signal. By means of the reflectors, the density of the content can be determined at different levels along the transmission line probe. 'Predetermined positions' should here be construed as meaning that the distances to the reflectors are known. It can be noted that determining the density using reflectors along a probe line is previously known from NO331262 (KONGSBERG MARITIME AS), but for liquids with extremely low radar loss, not for lossy materials like (cereal) grains. Alternatively or complementary to the reflectors, an average density could be determined based on a reflection from the lower end of the transmission line probe, which reflection may be enabled by the insulating dielectric beads. However, by means of the aforementioned reflectors, it is possible to get one or more density determinations higher up, in case the electromagnetic transmission signal despite the insulating dielectric beads does not reach the lower end of the transmission line probe.

The reflectors may be included in some of the insulating dielectric beads of the plurality of insulating dielectric beads. In other words, some of the insulating dielectric beads of the plurality of insulating dielectric beads may each include at least one of said reflectors. In this way, also sections of the at least one probe line where the reflectors are provided can be insulated to decrease the electromagnetic signal attenuation. The reflectors may for example be metallic inserts in a plastic or ceramic material of the insulating dielectric beads. The metallic insert could for example be a ring or a cylindrical pipe embedded in the plastic or ceramic material of the insulating dielectric bead. Alternatively, the metallic insert could be a U-shaped member that e.g. is clamped on the probe line, wherein the plastic or ceramic material of the insulating dielectric bead is provided around the U-shaped member.

One or more of the plurality of insulating dielectric beads may be fixedly attached to the at least one probe line (whereas the other insulating dielectric beads may be more loosely attached to the at least one probe line). This means that a fixedly attached insulating dielectric bead only has to take up loads caused by friction between the product and the insulating dielectric beads up to the next fixedly attached insulating dielectric bead, thereby distributing loads along the transmission line probe.

Preferably, the insulating dielectric beads that includes a reflector are fixedly attached to the at least one probe line. Hence the fixedly attached insulating dielectric beads may beneficially have two purposes: the aforementioned load distribution as well as ensuring that the reflectors are provided at fixed and predetermined positions along the at least one probe line.

The plurality of insulating dielectric beads may enclose at least a substantial portion of the at least one probe line. In this way, proper attenuation may be achieved. Any non-enclosed portions of the at least one probe line are preferably not longer than 1 or 2 dm in total, for a 30 m transmission line probe.

Furthermore, the plurality of insulating dielectric beads are preferably solid (non-hollow) or substantially solid. This may help to achieve sufficient reduction of electromagnetic signal attenuation caused by the product. The plurality of (substantially) solid insulating dielectric beads may for example have a distance of solid material which distances the at least one probe line from an outer surface of the insulating dielectric bead, which distance is at least 3 mm.

The insulating dielectric beads of the plurality of insulating dielectric beads may each have a height in the range of 50-250 mm, preferably in the range of 100-200 mm. This may allow the transmission line probe to be rolled up (e.g. for transportation), without having too many inter bead joints where moisture might be attached.

The plurality of insulating dielectric beads may be arranged such that a maximum distance (gap) between subsequent insulating dielectric beads of the plurality of insulating dielectric beads is less than 2 mm or less than 1 mm. This may prevent cereal grains from entering between subsequent insulating dielectric beads (which otherwise could increase the attenuation), while at the same time provide for a gap between subsequent insulating dielectric beads which is large enough to avoid accumulation of possible condensation water.

The insulating dielectric beads of the plurality of insulating dielectric beads may each have opposing surfaces adapted to face another insulating dielectric bead, the opposing surfaces including a first surface which is convex and a second surface which is concave. This may facilitate roll-up of the transmission line probe. The first convex surfaces may be rounded outward like the exterior of a sphere. The second concave surfaces may for example be rounded inward like the inside of a bowl. In use, the first convex surfaces are preferably top surfaces whereas the second concave surfaces are bottom surfaces. This may improve moisture drainage. Furthermore, the first and second surfaces are preferably complementary. This may prevent or at least reduce the risk that the product enters between two adjacent insulating dielectric beads. In another embodiment, the first and second surfaces could be flat.

The aforementioned at least one probe line may be twin (=two) probe lines. To this end, each insulating dielectric bead of the plurality of insulating dielectric beads may have two holes, one for each probe line. The twin probe lines (and the holes for the two probe lines) are typically parallel. Alternatively, the aforementioned at least one probe line may be a single probe line.

At least some of the insulating dielectric beads of the plurality of insulating dielectric beads may each have at least one hole configured to reduce a local dielectric constant. This may be used to tune the coupling between the aforementioned two probe lines. The at least one hole may be parallel to the probe lines, i.e. typically vertical when in operation. The at least one hole could for example be a recess positioned between the two probe lines.

According to a second aspect of the present invention, there is provided a radar level gauge system configured to determine a filling level and a density of a product contained in a container, wherein the radar level gauge system comprises: transceiver circuitry configured to generate and transmit an electromagnetic transmit signal, and to receive an electromagnetic return signal; a transmission line probe according to the first aspect; and processing circuitry configured to determine the filling level of the product contained in the container based on a relationship between the electromagnetic transmit signal and the electromagnetic return signal, and to determine the density of the product contained in the container based on one or more electromagnetic reflector signals produced by the transmission line probe. The one or more electromagnetic reflector signals may for example be produced by the aforementioned reflectors and/ or the (lower) end of the transmission line probe. This aspect may exhibit the same or similar feature and technical effect as the first aspect, and vice versa.

According to a third aspect of the present invention, there is provided a method of determining a filling level and a density of a product contained in a container, wherein the method comprises: generating and transmitting an electromagnetic transmit signal; guiding the electromagnetic transmit signal towards and at least partly through the product by means of at least one probe line of a transmission line probe, wherein the transmission line probe further comprises a plurality of insulating dielectric beads arranged along the at least one probe line and configured to decrease electromagnetic signal attenuation caused by the product; by means of the at least one probe line, guiding an electromagnetic return signal back from a surface or interface of the product and guiding one or more electromagnetic reflector signals produced by the transmission line probe; determining the filling level of the product contained in the container based on a relationship between the electromagnetic transmit signal and the electromagnetic return signal; and determining the density of the product contained in the container based on the one or more electromagnetic reflector signals. Determining the filling level and density may be performed by the aforementioned processing circuitry. This aspect may exhibit the same or similar feature and technical effect as the first and/or second aspects, and vice versa.

The product may cereal grains. Alternatively, the product could be some other granulated material, such as plastic granulates.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
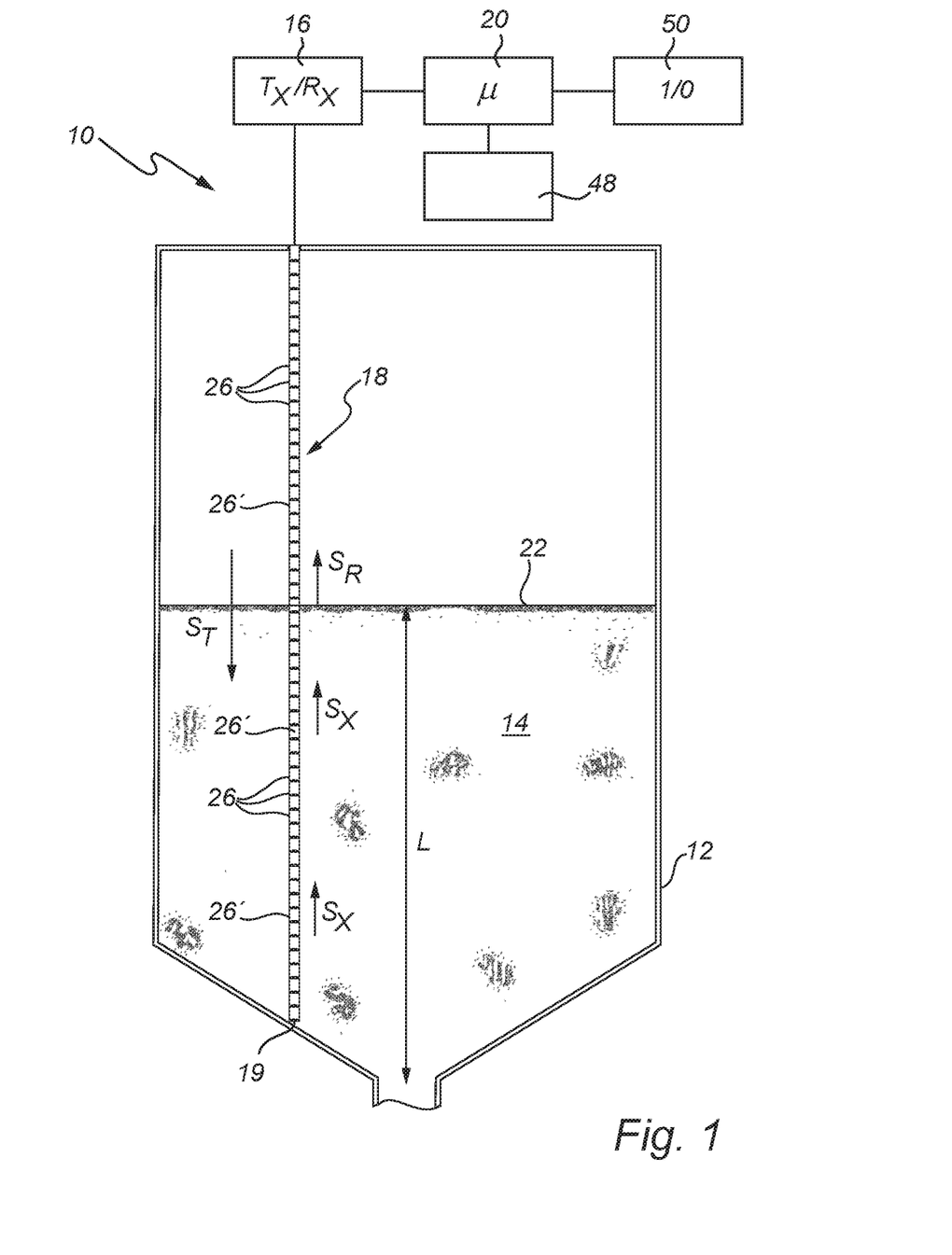
FIG. 1 is a schematic side view of a radar level gauge system according to an embodiment of the present invention.

FIG. 1 illustrates a radar level gauge system 10 according to an embodiment of the present invention. The radar level gauge system 10 may be a time domain reflectometry (TDR) radar level gauge system. The radar level gauge system 10 is mounted to a container 12. The container 12 is here a silo. The container 12 can be 20-30 m high, for example. The radar level gauge system 10 is configured to determine a filling level L and at least one density p of a product 14 contained in the container 12. The product 14 may be cereal grains, such as rice, corn, wheat, etc. The cereal grains could have a grain size of up to 20 mm, for example.

The radar level gauge system 10 comprises transceiver circuitry 16, a transmission line probe 18, and processing circuitry 20. The transceiver circuitry 16 is (electrically) connected to the transmission line probe 18 and to the processing circuitry 20.

The transceiver circuitry 16 is configured to generate and transmit an electromagnetic transmit signal $S_T$, and to receive an electromagnetic return signal $S_R$ reflected by a surface 22 of the product 14. The transceiver circuitry 16 can be one unit capable of transmitting and receiving, or comprise separate transmitter and receiver units.

The transmission line probe 18 may be vertically arranged in the container 12, and may extend from the top of the container 12 to the full depth or almost the full depth of the container 12. The transmission line probe 18 can for example have a length in the range of 15-50 m. The transmission line probe 18 has a (lower) end 19.

Figure 2:
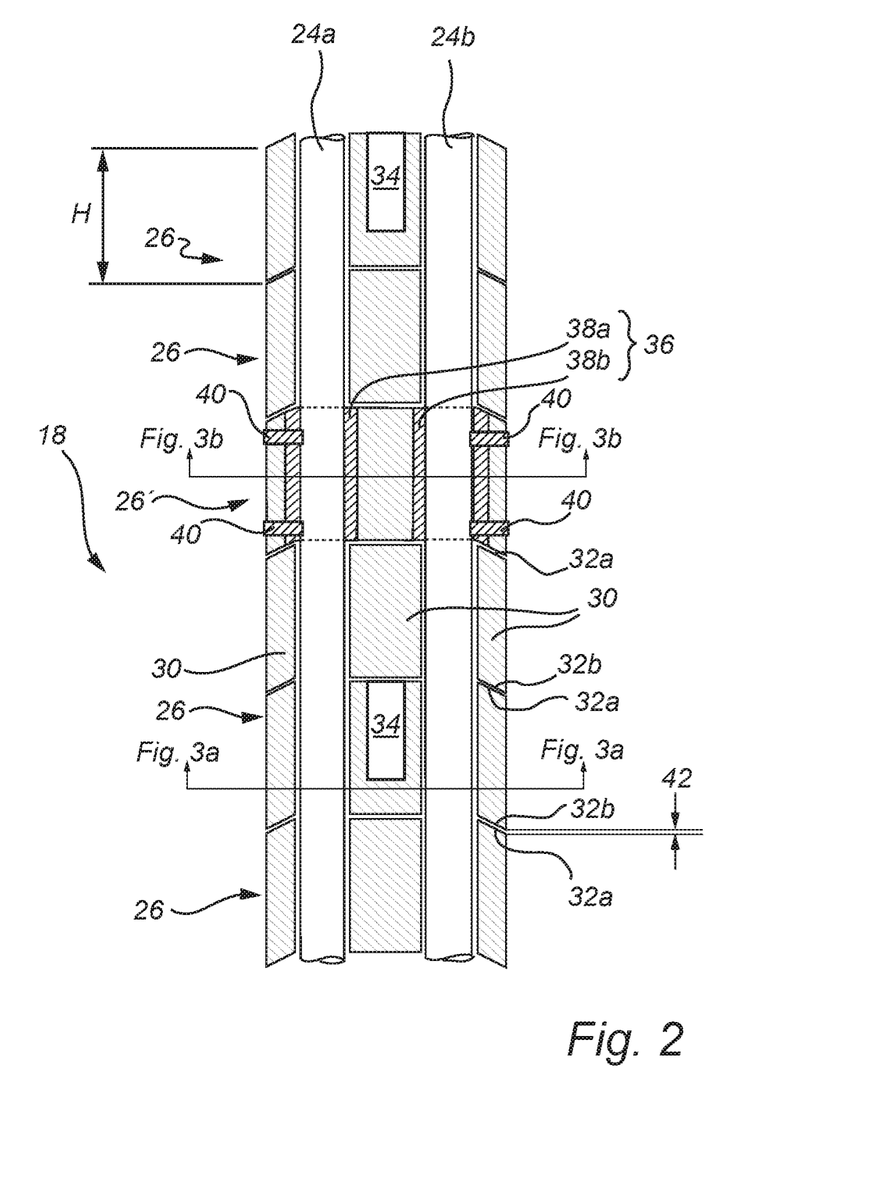
FIG. 2 is cross-sectional partial side view of a transmission line probe according to an embodiment of the present invention.
Figure 3A:
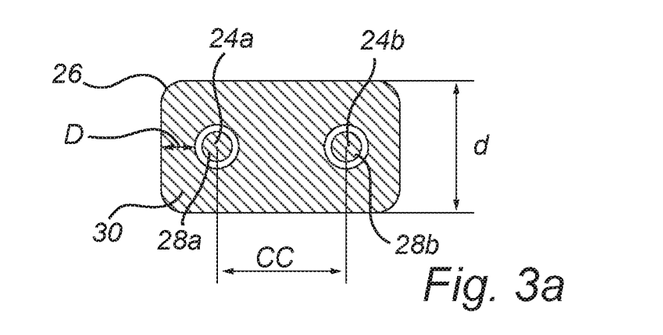
FIGS. 3a-b are sectional views of the transmission line probe of FIG. 2.
Figure 3B:
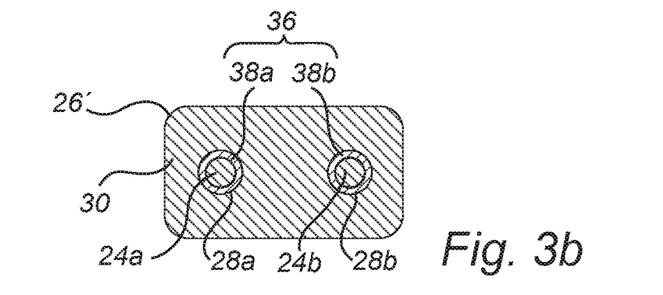

With further reference to FIGS. 2 and 3a-b, the transmission line probe 18 comprises at least one probe line, here two probe lines 24a-b (=twin probe lines). The two probe lines 24a-b may be parallel. The probe lines 24a-b may be wires. The probe lines 24a-b may be flexible. The probe lines 24a-b can for example be made of (stainless) steel. The probe lines 24a-b could also be referred to as leads or conductors. The probe lines 24a-b could each have a diameter in the range of 6-8 mm, for example. The probe lines 24a-b are adapted to guide the electromagnetic transmit signal $S_T$ from the transceiver circuitry 16 down towards and through the product 14 in the container 12, and to guide the electromagnetic return signal $S_R$ back from the surface 22, so that the electromagnetic return signal $S_R$ can be received by the transceiver circuitry 16.

Figure 4:
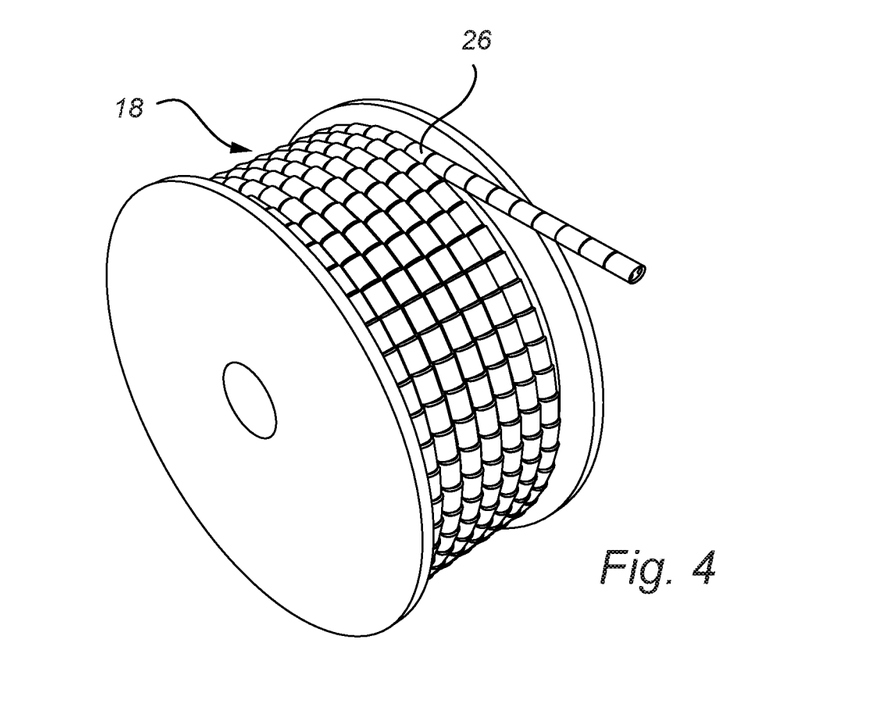
FIG. 4 schematically shows the transmission line probe of FIG. 2 rolled up.

The transmission line probe 18 further comprises a plurality of insulating dielectric beads 26. The insulating dielectric beads 26 are configured to decrease electromagnetic signal attenuation caused by the product 14, by limiting the electric field outside the insulating dielectric beads 26. Namely, insulating dielectric beads 26 may be configured to decrease electromagnetic signal attenuation caused by the product 14 by an insulation giving a velocity reduction factor above 0.9, as discussed in the Summary of the invention section. The insulating dielectric beads 26 may be arranged after, and adjacent to, each other along substantially the complete length of the two probe lines 24a-b. In this way, the insulating dielectric beads 26 may enclose at least a substantial portion of the at probe lines 24a-b. The insulating dielectric beads 26 may be threaded on the two probe lines 24a-b. To this end, each insulating dielectric bead 26 may have two through holes 28a-b, one for each probe line 24a-b. The through holes 28a-b may be (slightly) wider than the probe lines 24a-b, to simplify mounting of the insulating dielectric beads 26 and/or facilitate reeling of the transmission line probe 18. The diameter of the through holes 28a-b could for example be 7.5 mm for 6 mm diameter probe lines 24a-b. Furthermore, the through holes 28a-b could be conical (wider) at the ends, to facilitate reeling of the transmission line probe 18. FIG. 4 schematically shows the transmission line probe 18 rolled up.

Each insulating dielectric bead 26 may be (substantially) solid. In other words, each insulating dielectric bead 26 may be a non-hollow body. The insulating dielectric beads 26 can for example be made of, or comprise, plastic or ceramic material 30, such as PTFE (Polytetrafluoroethylene) or PEEK (Polyether ether ketone) or PE (Polyethylene) or porcelain or ceramic particles in plastic. Furthermore, the insulating dielectric beads 26 may generally be shaped like rectangular parallelepipeds or solid elliptic cylinders. The outer sides of the insulating dielectric beads 26 facing the product 14 are preferably smooth, to reduce the friction against the product 14. The insulating dielectric beads 26 may for example have a base of 12-30 mm times 18-52 mm (thickness×width), and a height H in the range of 50-250 mm, preferably in the range of 100-200 mm. The distance D which distances the probe lines 24a-b from an outer surface of the insulating dielectric bead 26 may be least 3 mm. The CC (center-to center) distance between the two probe lines 24a-b (corresponding to the CC distance between the through holes 28a-b) may for example be in the range of 11-13 mm for insulating dielectric beads 26 with a 20×45 mm base. A wider CC distance could cause too much attenuation, and a narrower CC distance could reduce the electromagnetic return signal $S_R$ too much. Generally, the CC distance is preferably about 0.75 times (or 75% of) the thickness d of the insulating dielectric beads 26.

The opposing surfaces 32a-b adapted to face another insulating dielectric bead 26, i.e. the top and bottom surfaces as shown in FIG. 2, may be (slightly) convex and concave, respectively. The surface 32a-b could be complementary. That is, the top surface 32a of one insulating dielectric bead 26 could match the bottom surface 32b other the insulating dielectric bead 26 immediately above. The two through holes 28a-b run between the surfaces 32a-b. At least some of the insulating dielectric beads 26 could also have at least one vertical hole configured to reduce the local dielectric constant. In FIG. 2, the at least one vertical hole is a recess 34 positioned between the two probe lines 24a-b and extending from the top surface 32a.

Some of the insulating dielectric beads denoted 26' here includes a reflector 36. The reflector 36 is generally configured to reflect a (small) portion of the aforementioned electromagnetic transmit signal $S_T$, thereby producing an electromagnetic reflector signal $S_X$. The electromagnetic reflector signal $S_X$ may be guided (back) from the reflectors 36 by the probe lines 24a-b and be received by the transceiver circuitry 16. The distance between the insulating dielectric beads 26' could be some meters. For example, every $10^{th}$-$20^{th}$ insulating dielectric bead could be an insulating dielectric bead 26' including a reflector 36.

The reflector 36 may for example be at least one metallic insert in the plastic or ceramic material 30 of the insulating dielectric bead 26'. The reflector 36/metallic insert(s) can for example be made of stainless steel. In the embodiment of FIG. 2, each reflector 36 includes two rings or cylindrical pipes 38a-b embedded in the plastic or ceramic material 30, one at each through hole 28a-b of the bead 26', such that the probe lines 24a-b passes through the rings/cylindrical pipes 38a-b.

The reflectors 36 should be provided at fixed and predetermined positions along the probe lines 24a-b. 'Predetermined' means that the distances from a reference position, typically at the top of the container 12, to the reflectors 36 are known. To this end, the insulating dielectric beads 26' that include a reflector 36 are fixedly attached to the probe lines 24a-b, for example by means of screws 40 going through the plastic or ceramic material 30 and the metal inserts 38a-b and into the probe lines 24a-b.

The other insulating dielectric beads 36 may be more loosely attached to the probe lines 24a-b, allowing some movement of the insulating dielectric beads 26 along the probe lines 24a-b. The plurality of insulating dielectric beads 26, 26' may be arranged such that a maximum distance (gap) 42 between subsequent insulating dielectric beads 26, 26' is <2 mm. Depending on the circumstances, the surface 32a of one insulating dielectric bead 26, 26' could abut surface 32b of another adjacent insulating dielectric bead 26, 26'.

Figure 5A:
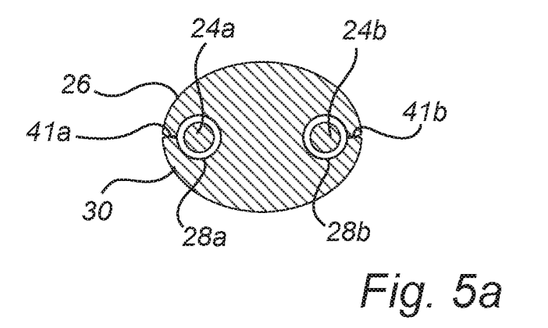
FIGS. 5a-c show insulating dielectric beads according to other embodiments of the present invention.
Figure 5B:
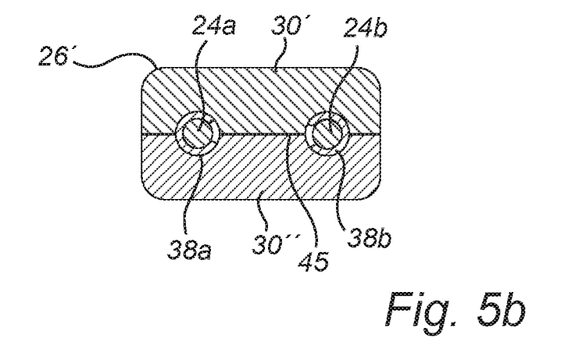
Figure 5C:
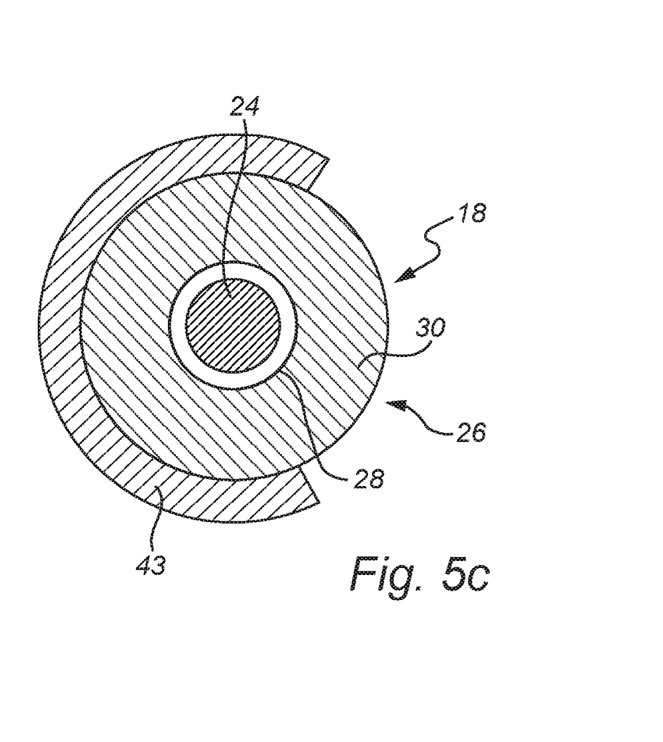

FIGS. 5a-c show alternative designs of the insulating dielectric beads 26, 26'.

In FIG. 5a, the insulating dielectric bead 26 has outer cuts or grooves 41a-b, one for each through hole 28a-b, and the material 30 is elastic. Here the insulating dielectric beads 26 can be provided on the probe lines 24a-b by passing the probe lines 24a-b through the respective cuts or grooves 41a-b. Hence there is no need to thread these insulating dielectric beads 26 on the probe lines 24a-b. The cuts or grooves 41a-b could be spiral-shaped, making it impossible or at least very difficult for the probe lines 24a-b to pass out through the cuts or grooves 41a-b once they are in the proper mounted position.

In FIG. 5b, the metallic inserts 38a-b are two U- or C-shaped members, one clamped or screwed on each probe line 24a-b. Furthermore, the plastic or ceramic material 30 of the insulating dielectric bead 26' is in two parts 30' and 30". In this way, the plastic or material 30 can easily be provided around the U- or C-shaped members 38a-b after the latter has been attached to the probe lines 24a-b. Once the two parts 30' and 30" have been brought together, they can be joined in various ways, as appreciated by the skilled person. The joint 45 between the two parts 30' and 30" is perpendicular to the base of the insulating dielectric bead 26' and traverses both through holes 28a-b. The two-part plastic or ceramic material 30 could be applied also to insulating dielectric beads 26 not having any reflector 36/metallic insert 38a-b.

In FIG. 5c, the transmission line probe 18 has a single probe line 24, and consequently the insulating dielectric beads 26 have one through hole 28. Here the transmission line probe 18 is pressed into a U- or C-shaped profile 43. The profile 43 and the insulating dielectric beads 26 can be formed such that with some deformation of the material 30 of the insulating dielectric beads 26, the transmission line probe 18 can be fixed to the profile 43. The profile 43 may form part of the aforementioned radar level gauge system 10. The profile 43 can be made of a metallic material, for example (extruded) aluminum. The profile 43 can be vertically arranged. The profile 43 can for example be attached to the inner wall of the container 12, along a ladder in the container 12, along a vertical pipe in the container 12, etc. Furthermore, the profile 43 could be parted in pieces of say a few meters, for easy transportation.

Figure 6:
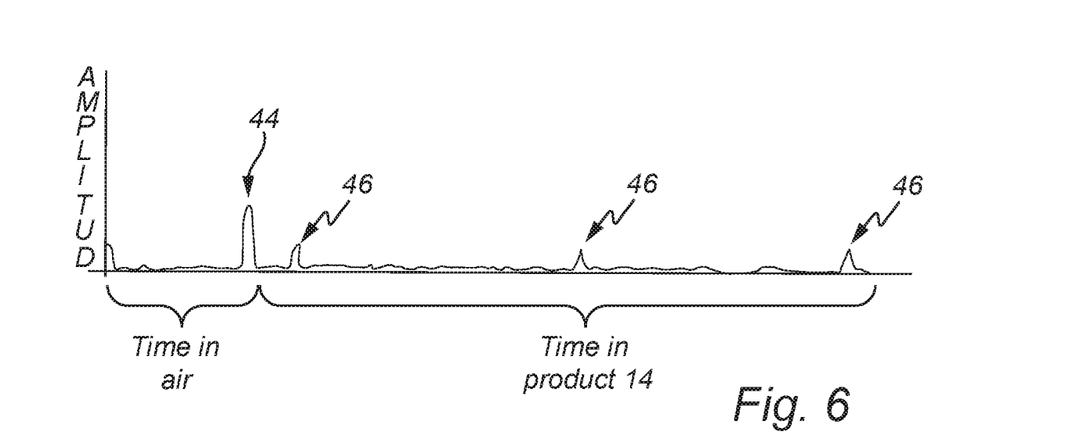
FIG. 6 is a tank signal generated by the radar level gauge system of FIG. 1.

Returning to FIG. 1, the processing circuitry 20 is configured to determine the filling level L of the product 14 contained in the container 12 based on a relationship between the electromagnetic transmit signal $S_T$ and the electromagnetic return signal $S_R$. Specifically, the processing circuitry 20 may determine the distance from the reference position at the top of the container 12 to the surface 22 of the product 14 based on the time delay between the electromagnetic transmit signal $S_T$ and the electromagnetic return signal $S_R$, from which distance the filling level L may be determined. An exemplary signal (tank spectrum) wherein the echo of the surface 22 is designated by 44 is shown in FIG. 6.

The processing circuitry 20 is further configured to determine the density ρ of the product 14 contained in the container 12 based on the electromagnetic reflector signals $S_X$ produced by the reflectors 36. The echoes of three reflectors 36 below the surface 22 are designated by 46 in FIG. 6. The processing circuitry 20 may for example determine the electromagnetic signal speed(s) and attenuation from the known distances of the reflectors 36 and the time delay between the electromagnetic transmit signal $S_T$ and the electromagnetic reflector signals $S_X$, at least for the reflectors 36 below the surface 22. The determined electromagnetic signal speed(s) and attenuation in the product 14 depends on the dielectric constant of the product 14, which in turn is related to the density p of the product 14. Hence the density p of the product 14 can be determined.

By means of the determined filling level L and density ρ, the mass and/or moisture content of the (cereal) grains 14 contained in the container 12 can be determined, for example from predetermined tables for different types of grains.

The processing circuitry 20 may be connected to a memory 48 of the radar level gauge system 10, which memory may store any software (computer program product) required for the operation of the radar level gauge system 10.

The radar level gauge system 10 may further comprise an interface 50 for communication of the determined filling level and density externally of the radar level gauge system 10. The interface 46 may for example be wireless (e.g. wireless HART) or wired (e.g. two-wire 4-20 mA loop, HART, etc.). In case the interface 50 is wireless, the radar level gauge system 10 can further include a local power supply, such as a battery pack.

Figure 7:
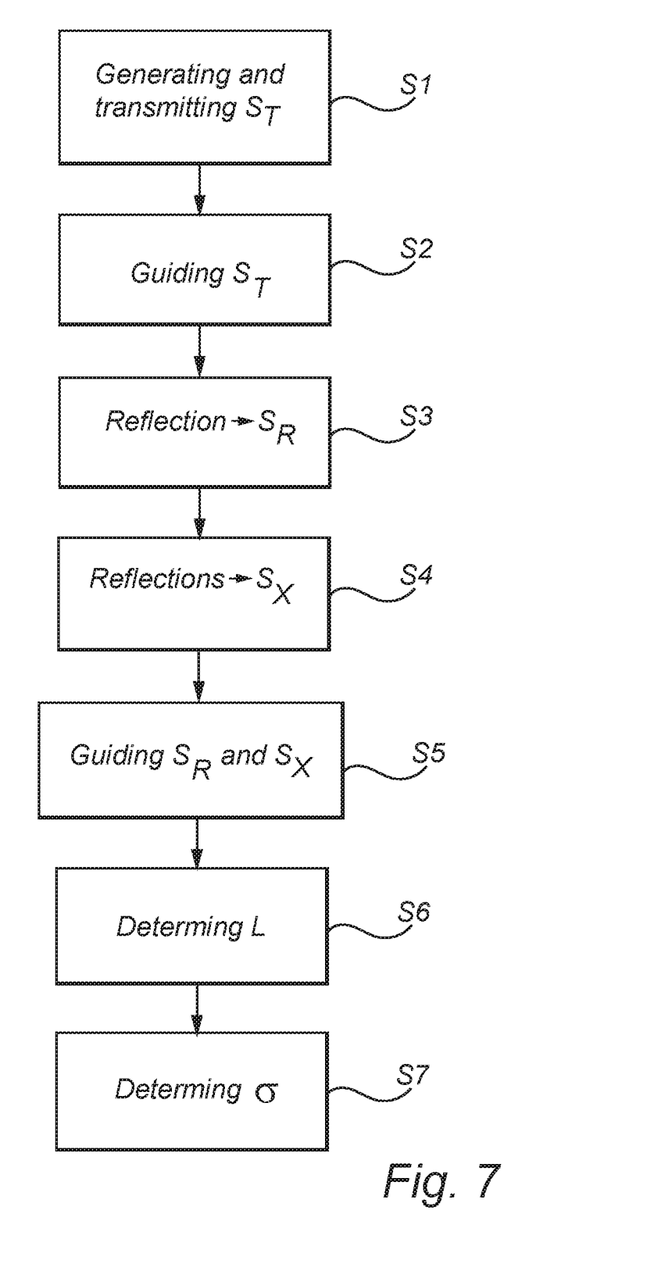
FIG. 7 is a flow chart of a method according to an embodiment of the present invention.

FIG. 7 is a flow chart of a method of determining the filling level L and density of the product 14 contained in the container. The method may for example be performed using the radar level gauge system 10. Hence the method may correspond to operation of the radar level gauge system 10.

At S1, the method may comprises generating and transmitting an electromagnetic transmit signal $S_T$ including one or more pulses. This step may be performed by the transceiver circuitry 16.

The electromagnetic transmit signal $S_T$ is guided towards, into, and through the product 14 by means of the probe lines 24a-b of the transmission line probe 18 (S2).

Some of the electromagnetic transmit signal $S_T$ is reflected by the surface 22 to produce the electromagnetic return signal $S_R$ (S3), whereas some of the electromagnetic transmit signal $S_T$ continues down through the product 14, where it is reflected by the reflectors 36 to produce the electromagnetic reflector signals $S_X$ (S4).

The electromagnetic return signal $S_R$ and the electromagnetic reflector signals $S_X$ are guided back by the means of the probe lines 24a-b (S5).

At S6, the filling level L of the product 14 contained in the container 12 is determined based on a relationship between the electromagnetic transmit signal $S_T$ and the electromagnetic return signal $S_R$.

At S7, the density of the product 14 contained in the container 12 is determined based on one or more of the electromagnetic reflector signals $S_X$ produced by the reflectors 36.

Steps S6-S7 may be performed by the processing circuitry 20. Steps S6-S7 may be computer-implemented.

The person skilled in the art realizes that the present invention by no means is limited to the preferred embodiments described above. On the contrary, many modifications and variations are possible within the scope of the appended claims.

The invention claimed is:

1. A transmission line probe for use in a radar level gauge system configured to determine a filling level and a density of a product contained in a container, wherein the transmission line probe comprises:
   at least one probe line adapted to guide an electromagnetic transmit signal towards and at least partly through the product, and to guide an electromagnetic return signal back from a surface or an interface below the surface of the product; and
   a plurality of insulating dielectric beads arranged along the at least one probe line and configured to decrease electromagnetic signal attenuation caused by the product, wherein the plurality of insulating dielectric beads arranged along the at least one probe line are configured to decrease electromagnetic signal attenuation caused by the product by an insulation giving a velocity reduction factor above 0.9.

2. A transmission line probe according to claim 1, wherein the velocity reduction factor indicates how much slower the electromagnetic signals travel along or in the transmission line probe when the transmission line probe is in the product compared to when the transmission line probe is in air.

3. A transmission line probe according to claim 1, wherein one or more of the plurality of insulating dielectric beads are fixedly attached to the at least one probe line.

4. A transmission line probe according to claim 1, wherein the plurality of insulating dielectric beads enclose at least a substantial portion of the at least one probe line.

5. A transmission line probe according to claim 1, wherein the plurality of insulating dielectric beads are solid or substantially solid.

6. A transmission line probe according to claim 1, wherein the insulating dielectric beads of the plurality of insulating dielectric beads each has a height in the range of 50-250 mm.

7. A transmission line probe according to claim 1, wherein the plurality of insulating dielectric beads are arranged such that a maximum distance between subsequent insulating dielectric beads of the plurality of insulating dielectric beads is less than 2 mm or less than 1 mm.

8. A transmission line probe according to claim 1, wherein the insulating dielectric beads of the plurality of insulating dielectric beads each has opposing surfaces adapted to face another insulating dielectric bead, the opposing surfaces including a first surface which is convex and a second surface which is concave.

9. A transmission line probe according to claim 1, wherein the insulating dielectric beads of the plurality of insulating dielectric beads each has a height in the range of 100-200 mm.

10. A radar level gauge system configured to determine a filling level and a density of a product contained in a container, wherein the radar level gauge system comprises:
transceiver circuitry configured to generate and transmit an electromagnetic transmit signal, and to receive an electromagnetic return signal;
a transmission line probe according to claim 1; and
processing circuitry configured to determine the filling level of the product contained in the container based on a relationship between the electromagnetic transmit signal and the electromagnetic return signal, and to determine the density of the product contained in the container based on one or more electromagnetic reflector signals produced by the transmission line probe.

11. A transmission line probe according to claim 1, wherein the at least one probe line is twin probe lines.

12. A transmission line probe according to claim 11, wherein at least some of the insulating dielectric beads of the plurality of insulating dielectric beads each has at least one hole configured to reduce a local dielectric constant.

13. A transmission line probe according to claim 1, wherein the transmission line probe further comprises reflectors provided at fixed and predetermined positions along the at least one probe line, wherein each reflector of the reflectors is configured to reflect a portion of the electromagnetic transmit signal.

14. A transmission line probe according to claim 13, wherein the reflectors are included in some of the insulating dielectric beads of the plurality of insulating dielectric beads.

15. A transmission line probe according to claim 14, wherein the reflectors are metallic inserts in a plastic or ceramic material of the insulating dielectric beads.

16. A transmission line probe according to claim 14, wherein the insulating dielectric beads that includes a reflector are fixedly attached to the at least one probe line.

17. A method of determining a filling level and a density of a product contained in a container, wherein the method comprises:
generating and transmitting an electromagnetic transmit signal;
guiding the electromagnetic transmit signal towards and at least partly through the product by means of at least one probe line of a transmission line probe, wherein the transmission line probe further comprises a plurality of insulating dielectric beads arranged along the at least one probe line and configured to decrease electromagnetic signal attenuation caused by the product, wherein the plurality of insulating dielectric beads arranged along the at least one probe line are configured to decrease electromagnetic signal attenuation caused by the product by an insulation giving a velocity reduction factor above 0.9;
by means of the at least one probe line, guiding an electromagnetic return signal back from a surface or interface of the product and guiding one or more electromagnetic reflector signals produced by the transmission line probe;
determining the filling level of the product contained in the container based on a relationship between the electromagnetic transmit signal and the electromagnetic return signal; and
determining the density of the product contained in the container based on the one or more of the electromagnetic reflector signals.

18. A method according to claim 17, wherein the product is cereal grains.

* * * * *